US012684151B2

(12) United States Patent
Nishimura et al.

(10) Patent No.: US 12,684,151 B2
(45) Date of Patent: Jul. 14, 2026

(54) MESH DECODING DEVICE, MESH ENCODING DEVICE, MESH DECODING METHOD, AND PROGRAM

(71) Applicant: KDDI CORPORATION, Tokyo (JP)

(72) Inventors: Hitoshi Nishimura, Fujimino (JP); Kei Kawamura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 19/061,755

(22) Filed: Feb. 24, 2025

(65) Prior Publication Data

US 2025/0193429 A1      Jun. 12, 2025

Related U.S. Application Data

(63) Continuation of application No. PCT/JP2023/029764, filed on Aug. 17, 2023.

(30) Foreign Application Priority Data

Oct. 13, 2022      (JP) ................................. 2022-165086

(51) Int. Cl.
| | |
|---|---|
| *H04N 19/00* | (2014.01) |
| *H04N 19/13* | (2014.01) |
| *H04N 19/18* | (2014.01) |
| *H04N 19/44* | (2014.01) |
| *H04N 19/597* | (2014.01) |
| *H04N 19/63* | (2014.01) |

(52) U.S. Cl.
CPC ............. *H04N 19/44* (2014.11); *H04N 19/13* (2014.11); *H04N 19/18* (2014.11); *H04N 19/597* (2014.11); *H04N 19/63* (2014.11)

(58) Field of Classification Search
CPC .................................................... H04N 19/00
See application file for complete search history.

(56) References Cited

U.S. PATENT DOCUMENTS

| | | | |
|---|---|---|---|
| 9,525,876 B2 | 12/2016 | Ikai et al. | |
| 2014/0307801 A1 | 10/2014 | Ikai et al. | |
| 2017/0041635 A1 | 2/2017 | Ikai et al. | |
| 2018/0160144 A1* | 6/2018 | Ikai ........................ H04N 19/13 | |
| 2019/0052905 A1 | 2/2019 | Ikai et al. | |

(Continued)

FOREIGN PATENT DOCUMENTS

| | | |
|---|---|---|
| JP | 2021530889 A | 11/2021 |
| WO | 2013065702 A1 | 5/2013 |
| WO | 2019176319 A1 | 9/2019 |

OTHER PUBLICATIONS

"Cfp for Dynamic mesh Coding", ISO/IEC JTC1/SC29/WG7; N00231; MPEG136.

(Continued)

*Primary Examiner* — Maryam A Nasri
(74) *Attorney, Agent, or Firm* — Holtz, Holtz & Volek PC

(57) ABSTRACT

A circuit of a mesh decoding device 200: generates a binarization syntax by performing arithmetic decoding on the displacement bit stream; updates a context value using the binarization syntax; generates a context value for output using the context value, a bit position, and a syntax read from a context buffer 206D; generates and outputs a syntax to the context buffer 206D by multi-value conversion of the binarization syntax; generates a coefficient level value from the syntax.

6 Claims, 14 Drawing Sheets

(56) References Cited

U.S. PATENT DOCUMENTS

| | | |
|---|---|---|
| 2020/0154140 A1 | 5/2020 | Ikai et al. |
| 2021/0084335 A1 | 3/2021 | Ikai et al. |
| 2021/0112281 A1 | 4/2021 | Wang |
| 2021/0209806 A1 | 7/2021 | Oh et al. |
| 2024/0205407 A1* | 6/2024 | Tokumo .................. G06T 9/001 |

OTHER PUBLICATIONS

"Google Draco", accessed on May 26, 2022 [Online], https://google.github.io/draco.

International Search Report (ISR) (and English language translation thereof) dated Nov. 7, 2023, issued in International Application No. PCT/JP2023/029764.

Written Opinion dated Nov. 7, 2023, issued in International Application No. PCT/JP2023/029764.

* cited by examiner

FIG. 4

| SYNTAX NAME | DESCRIPTION | ARITHMETIC DECODING UNIT | MULTI-VALUE CONVERSION UNIT |
|---|---|---|---|
| last_sig_coeff_prefix | PREFIX OF COORDINATE POSITION OF LEADING NON-ZERO COEFFICIENT IN SCAN ORDER | OPERATION | OPERATION |
| last_sig_coeff_suffix | SUFFIX OF COORDINATE POSITION OF LEADING NON-ZERO COEFFICIENT IN SCAN ORDER | OPERATION | OPERATION |
| coded_block_flag | FLAG INDICATING THAT THERE IS NON-ZERO COEFFICIENT IN BLOCK | OPERATION | — |
| last_sig_coeff_block_prefix | PREFIX OF COORDINATE POSITION OF LEADING NON-ZERO COEFFICIENT IN SCAN ORDER IN BLOCK | OPERATION | OPERATION |
| last_sig_coeff_block_suffix | SUFFIX OF COORDINATE POSITION OF LEADING NON-ZERO COORDINATE COEFFICIENT IN SCAN ORDER IN BLOCK | OPERATION | OPERATION |
| sig_coeff_flag | FLAG INDICATING WHETHER IT IS NON-ZERO COEFFICIENT | OPERATION | — |
| coeff_abs_level_greater1_flag | FLAG INDICATING WHETHER ABSOLUTE VALUE OF COEFFICIENT IS 2 OR MORE (UP TO 8) | OPERATION | — |
| coeff_abs_level_greater2_flag | FLAG INDICATING WHETHER ABSOLUTE VALUE OF COEFFICIENT IS 3 OR MORE (1) | OPERATION | — |
| coeff_sign_flag | FLAG INDICATING POSITIVE OR NEGATIVE SIGN OF COEFFICIENT (0: POSITIVE, 1: NEGATIVE) | OPERATION | — |
| coeff_abs_level_remaining | VALUE OBTAINED BY SUBTRACTING VALUE EXPRESSED BY ABOVE FLAG FROM ABSOLUTE VALUE OF COEFFICIENT | OPERATION | OPERATION |

FIG. 5

| PREFIX VALUE | PREFIX CODE STRING | SUFFIX CODE STRING | COORDINATE VALUE |
|---|---|---|---|
| 0 | 1 | - | 0 |
| 1 | 10 | - | 1 |
| 2 | 110 | - | 2 |
| 3 | 1110 | - | 3 |
| 4 | 11110 | x | 4-5 |
| 0 | 111110 | x | 6-7 |
| 6 | 1111110 | xx | 8-11 |
| 7 | 11111110 | xx | 12-15 |
| 8 | 111111110 | xxx | 16-23 |
| 9 | 111111111 | xxx | 24-31 |

FIG. 6

| PREFIX CODE STRING | SUFFIX CODE STRING | |
| --- | --- | --- |
| | FIXED LENGTH CODE (k BITS) | CODE DEPENDING ON CODE LENGTH OF PREFIX |
| 0 | X ... X | - |
| 10 | X ... X | X |
| 110 | X ... X | XX |
| 1110 | X ... X | XXX |
| 11110 | X ... X | XXXX |
| . . . | . . . | |

FIG. 7 coeff_abs_level_remaining   ----- ...   -   ---- 11756914

| | | | | | | | | | | |
|---|---|---|---|---|---|---|---|---|---|---|
| BLOCK 3 | 0 | 0 | 0 | 0 | 0 | 0 | 0 | +1 | 0 | -1 | +2 |
| BLOCK 2 | 0 | 0 | 0 | 0 | 0 | 0 | 0 | 0 | 0 | 0 | 0 |
| BLOCK 1 | 0 | +1 | +1 | 0 | 0 | +14 | -10 | +8 | -9 | +12 | +17 |

FIG. 8

| | | | | | | | | | | | | | | | DECODING ORDER |
|---|---|---|---|---|---|---|---|---|---|---|---|---|---|---|---|
| x COORDINATE | +17 | +8 | 0 | +1 | 0 | 0 | 0 | 0 | 0 | 0 | 0 | +2 | 0 | 0 | 0 |
| y COORDINATE | +12 | +10 | 0 | 0 | 0 | 0 | 0 | 0 | 0 | 0 | +1 | 0 | 0 | 0 | 0 |
| z COORDINATE | -9 | +14 | +1 | 0 | 0 | 0 | 0 | 0 | 0 | -1 | 0 | 0 | 0 | 0 | 0 |

FIG. 9

| BLOCK/MATRIX SIZE | BIT POSITION | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| d x 32 | 0 | 1 | 2 | 3 | 4 | 5 | 6 | 7 | 8 | , | , | , |
| d x 64 | 9 | 10 | 11 | 12 | 13 | 14 | 15 | 16 | 17 | 18 | , | , |
| d x 128 | 19 | 20 | 21 | 22 | 23 | 24 | 25 | 26 | 27 | 28 | 29 | 30 |

FIG. 10

| DECODING TARGET BLOCK | RIGHT ADJACENT BLOCK (DECODED) |

FIG. 11-1

CASE OF RIGHT ADJACENT BLOCK coded_block_flag = 0

| | | | |
|---|---|---|---|
| +2 | +1 | 0 | 0 |
| +2 | +1 | 0 | 0 |
| +2 | +1 | 0 | 0 |

FIG. 11-2

CASE OF RIGHT ADJACENT BLOCK coded_block_flag = 1

| | | | |
|---|---|---|---|
| +2 | +2 | +2 | +2 |
| +2 | +2 | +2 | +2 |
| +2 | +2 | +2 | +2 |

FIG. 11-3

CASE OF RIGHT ADJACENT BLOCK coded_block_flag = 0

| | | | | | | | |
|---|---|---|---|---|---|---|---|
| +3 | +3 | +2 | +2 | +1 | +1 | 0 | 0 |
| +3 | +3 | +2 | +2 | +1 | +1 | 0 | 0 |
| +3 | +2 | +2 | +2 | +1 | +1 | 0 | 0 |

FIG. 14

| SPS | DPS | FRAME HEADER | ENCODED DISPLACEMENT | FRAME HEADER | ENCODED DISPLACEMENT | . . . |

MESH DECODING DEVICE, MESH ENCODING DEVICE, MESH DECODING METHOD, AND PROGRAM

CROSS-REFERENCE TO RELATED APPLICATIONS

The present application is a continuation of PCT Application No. PCT/JP2023/029764, filed on Aug. 17, 2023, which claims the benefit of Japanese patent application No. 2022-165086 filed on Oct. 13, 2022, the entire contents of each application being incorporated herein by reference in its entirety.

TECHNICAL FIELD

The present invention relates to a mesh decoding device, a mesh encoding device, a mesh decoding method, and a program.

BACKGROUND ART

Non Patent Literature 1: "Cfp for Dynamic Mesh Coding, ISO/IEC JTC1/SC29/WG7 N00231, MPEG136—Online" discloses a technique for encoding a mesh using Non Patent Literature 2: "Google Draco, accessed on May 26, 2022 [Online], https://google.github.io/draco".

SUMMARY OF THE INVENTION

However, in the anchor software of Non Patent Literature 1, since the original mesh data is simplified and then encoded, there is a problem that the encoding performance is poor. Therefore, the present invention has been made in view of the above-described problems, and an object of the present invention is to provide a mesh decoding device, a mesh encoding device, a mesh decoding method, and a program capable of improving encoding efficiency of a mesh.

The first aspect of the present invention is summarized as a mesh decoding device including: a circuit decodes a displacement bit stream to generate and output a displacement, wherein the circuit: generates a binarization syntax by performing arithmetic decoding on the displacement bit stream; updates a context value using the binarization syntax; obtains and accumulates the context values, bit positions, and syntax in a context buffer; generates a context value for output using the context value, the bit position, and the syntax read from the context buffer; generates and outputs the syntax to the context buffer by multi-value conversion of the binarization syntax; generates a coefficient level value from the syntax; generates transformed coefficients by inversely quantizing the coefficient level values; and generates a prediction residual by applying an inverse wavelet transform to the transformed coefficients.

The second aspect of the present invention is summarized as a mesh decoding method including: decoding a displacement bit stream to generate and output a displacement, wherein the decoding includes: generating a binarization syntax by performing arithmetic decoding on the displacement bit stream; updating a context value using the binarization syntax; obtaining and accumulating the context values, bit positions, and syntax in a context buffer; generating a context value for output using the context value, the bit position, and the syntax read from the context buffer; generating and outputting the syntax to the context buffer by multi-value conversion of the binarization syntax; generating a coefficient level value from the syntax; generating transformed coefficients by inversely quantizing the coefficient level values; and generating a prediction residual by applying an inverse wavelet transform to the transformed coefficients.

The third aspect of the present invention is summarized as a program for causing a computer to function as a mesh decoding device, wherein the program includes a circuit that decodes a displacement bit stream to generate and output a displacement, and the circuit: generates a binarization syntax by performing arithmetic decoding on the displacement bit stream; updates a context value using the binarization syntax; obtains and accumulates the context values, bit positions, and syntax in a context buffer; generates a context value for output using the context value, the bit position, and the syntax read from the context buffer; generates and outputs the syntax to the context buffer by multi-value conversion of the binarization syntax; generates a coefficient level value from the syntax; generates transformed coefficients by inversely quantizing the coefficient level values; and a generates a prediction residual by applying an inverse wavelet transform to the transformed coefficients.

According to the present invention, it is possible to provide a mesh decoding device, a mesh encoding device, a mesh decoding method, and a program capable of improving encoding efficiency of a mesh.

BRIEF DESCRIPTION OF THE DRAWINGS

FIG. 4 is a diagram illustrating an example of a syntax configuration.

FIG. 5 is a diagram illustrating a prefix code string and a suffix code string in a case where a maximum value is 32.

FIG. 6 is a diagram illustrating a prefix code string and a suffix code string according to a k-exponential Golomb coding.

FIG. 7 is a diagram illustrating a specific example of a syntax configuration.

FIG. 8 is a diagram illustrating a specific example of a syntax configuration.

FIG. 9 is a diagram for explaining an operation of a context selection unit 206E of the mesh decoding device 200 according to an embodiment.

Figure 10:
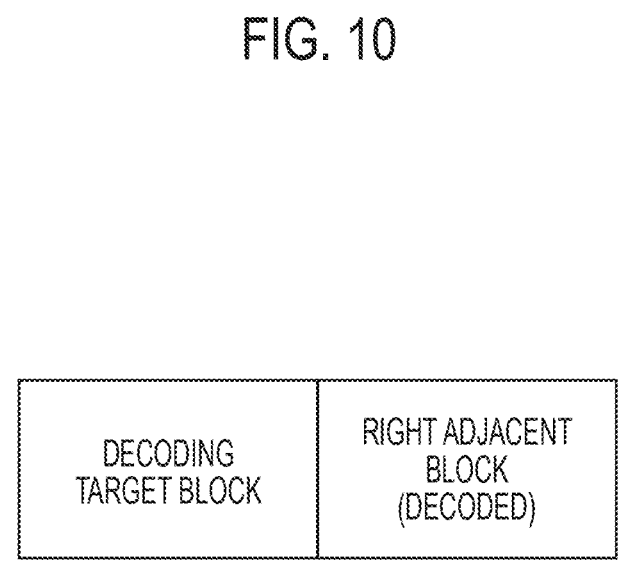

FIG. 10 is a diagram for explaining an operation of the context selection unit 206E of the mesh decoding device 200 according to an embodiment.

FIGS. 11-1, 11-2, and 11-3 are diagrams for explaining an operation of the context selection unit 206E of the mesh decoding device 200 according to an embodiment.

3

Figure 14:
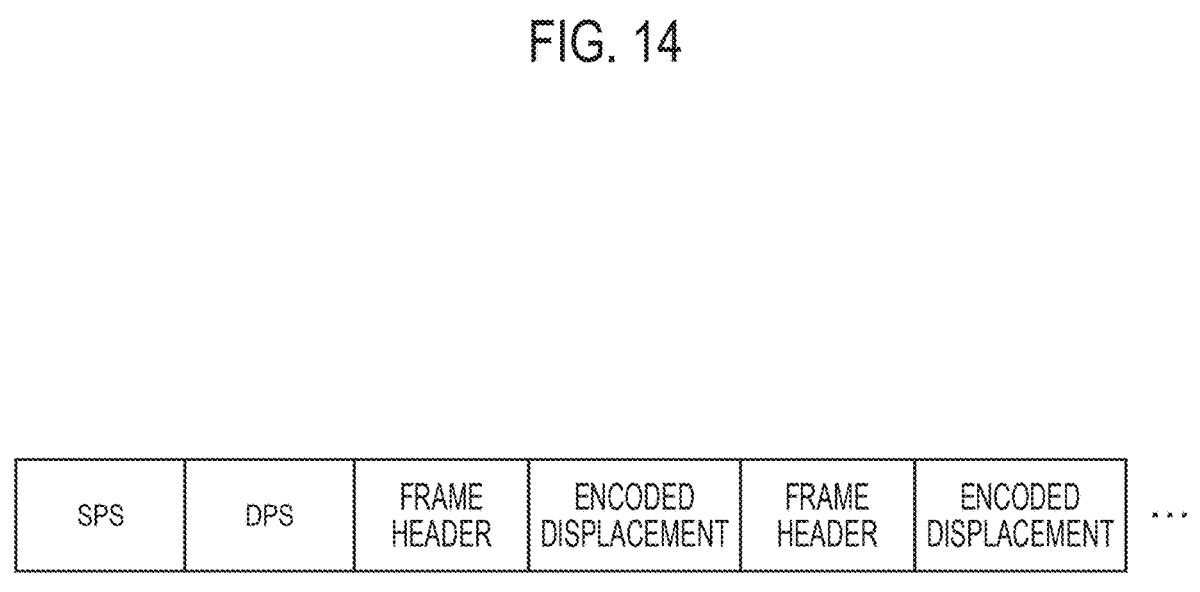

FIG. 14 is a diagram for explaining an example of a configuration of a bit stream of a displacement.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Hereinafter, a mesh processing system according to the present embodiment will be described with reference to FIGS. 1 to 16.

Figure 1:
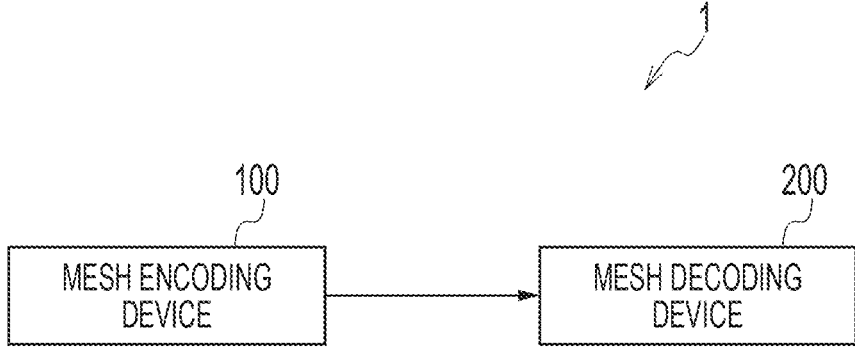
FIG. 1 is a diagram illustrating an example of a configuration of a mesh processing system 1 according to an embodiment.

FIG. 1 is a diagram illustrating an example of a configuration of a mesh processing system 1 according to the present embodiment. As illustrated in FIG. 1, the mesh processing system 1 includes a mesh encoding device 100 and a mesh decoding device 200.

Figure 2:
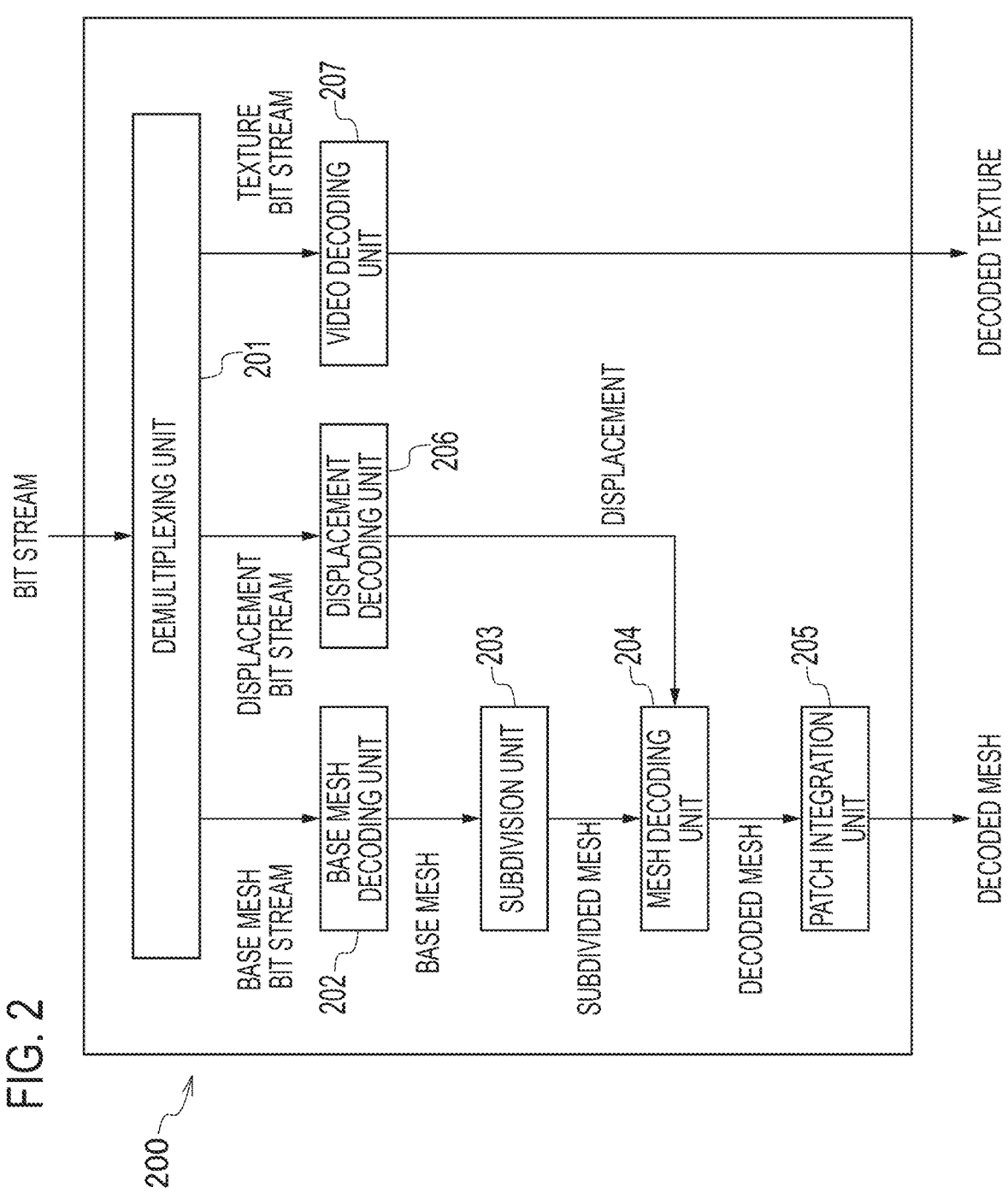
FIG. 2 is a diagram illustrating an example of functional blocks of a mesh decoding device 200 according to an embodiment.

FIG. 2 is a diagram illustrating an example of functional blocks of the mesh decoding device 200 according to the present embodiment.

As illustrated in FIG. 2, the mesh decoding device 200 includes a demultiplexing unit 201, a base mesh decoding unit 202, a subdivision unit 203, a mesh decoding unit 204, a patch integration unit 205, a displacement decoding unit 206, and a video decoding unit 207.

A demultiplexing unit 201 is configured to separate the multiplexed bit stream into a base mesh bit stream, a displacement bit stream, and a texture bit stream.

A base mesh decoding unit 202 is configured to decode a base mesh bit stream, and generate and output a base mesh.

A subdivision unit 203 is configured to generate and output the added subdivided vertices and their connectivity information from the base mesh decoded by the base mesh decoding unit 202 by a subdivision method indicated by the control information.

Here, the base mesh, the added subdivided vertex, and the connectivity information thereof are collectively referred to as a "subdivided mesh".

A mesh decoding unit 204 is configured to generate and output a decoded mesh using the subdivided mesh generated by the subdivision unit 203 and the displacement decoded by a displacement decoding unit 206.

A patch integration unit 205 is configured to integrate and output a plurality of patches of the decoded mesh generated by the mesh decoding unit 204.

The displacement decoding unit 206 is configured to decode a displacement bit stream to generate and output a displacement.

A video decoding unit 207 is configured to decode and output texture by video coding. For example, the video decoding unit 207 may use HEVC described in Non Patent Literature 1.

(Displacement Decoding Unit 206)

Figure 3:
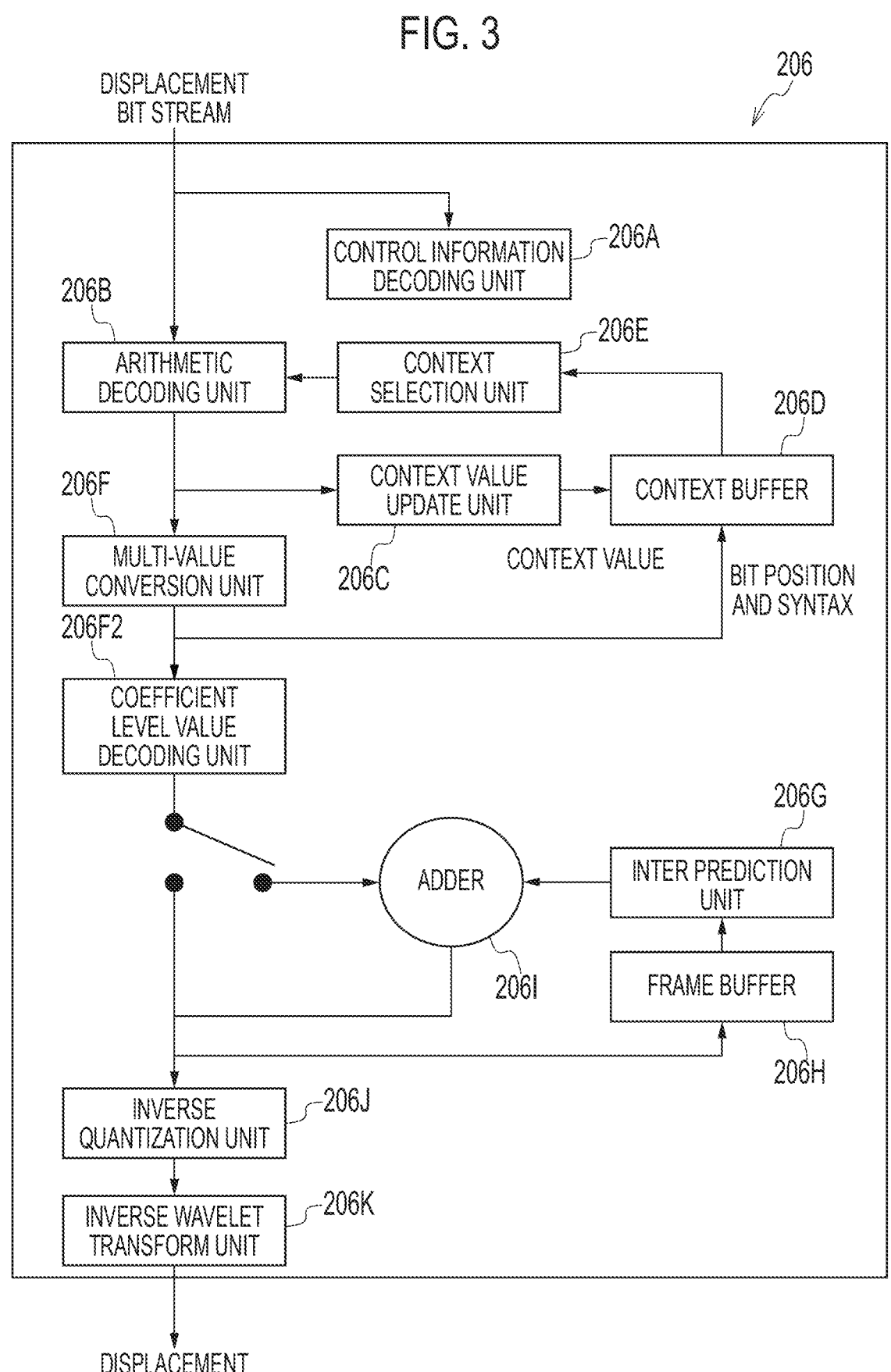
FIG. 3 is a diagram illustrating an example of functional blocks of a displacement decoding unit 206 of the mesh decoding device 200 according to an embodiment.

As illustrated in FIG. 3, the displacement decoding unit 206 includes a control information decoding unit 206A, an arithmetic decoding unit 206B, a context value update unit 2060, a context buffer 206D, a context selection unit 206E, a multi-value conversion unit 206F, a coefficient level value decoding unit 206F2, an inter prediction unit 206G, a frame buffer 206H, an adder 206I, an inverse quantization unit 206J, and an inverse wavelet transform unit 206K.

The control information decoding unit 206A is configured to output the control information by performing variable length decoding on the received displacement bit stream.

The arithmetic decoding unit 206B is configured to output a binarization syntax by performing arithmetic decoding on the received displacement bit stream. Details will be described later.

The context value update unit 206C is configured to update a context value using the binarization syntax and output the updated context value to the context buffer 206D. Details will be described later.

The context selection unit 206E is configured to generate and output a context value (context value for output) using the context value, the bit position, and the syntax read from the context buffer 206D. Details will be described later.

The context buffer 206D is configured to obtain and accumulate context values, bit positions, and syntax. The context buffer 206D is configured to output them according to control information (not illustrated).

The multi-value conversion unit 206F is configured to generate and output syntax by multi-value conversion of the binarization syntax. The generated (calculated) syntax is also output to the context buffer 206D as a bit position and syntax.

A coefficient level value decoding unit 206F2 is configured to generate and output a coefficient level value from syntax.

The inter prediction unit 206G is configured to generate and output a predicted displacement using the reference frame read from the frame buffer 206H.

The frame buffer H is configured to acquire and accumulate the decoded displacement. The frame buffer 206H outputs the decoded displacement at the corresponding vertex in the reference frame according to control information (not illustrated).

The adder 206I is configured to acquire the prediction residual and the predicted displacement. The adder 206I is configured to add these to generate and output a decoded displacement. The generated (calculated) decoding displacement is also output to the frame buffer 206H.

The inverse quantization unit 206J is configured to generate and output a transformed coefficients by inversely quantizing the coefficient level value.

The inverse wavelet transform unit 206K is configured to generate and output a prediction residual by performing inverse wavelet transform on transformed coefficients. The inverse wavelet transform is an inverse transform of the wavelet transform. The wavelet transform is a method in which a wavelet function is used as a basis, the basis is enlarged for a low-frequency component, and the basis is reduced for a high-frequency component, so that spatial and frequency information can be simultaneously analyzed.

(Syntax Configuration)

The syntax configuration will be described below with reference to FIGS. 4 to 8.

First, at the time of encoding, the coefficient level value of the displacement is represented by a 3×N size matrix in each frame. 3 denotes the dimension in the spatial domain and N denotes the total number of subdivided vertices. Such a matrix is divided into blocks and encoded in units of blocks.

The block size may be 3×n size (n<N) or 1×n size. Alternatively, a 1×n size and a 2×n size may be used in combination as the block size. For matrix elements less than the block size, a block is configured with the largest d×m size (d=1, 2, 3, m<n).

n may be variable for each block. For example, n may be determined by the subdivision level indicated by the control information and the total number of coefficient level values at each level (n1, n2, . . . ). Here, the subdivision level indicates the number of times of subdivision. For example, in a case where the subdivision level is 4, it may be configured by four blocks of 3×n1, 3×n2, 3×n3, and 3×n4.

FIG. 4 is a diagram illustrating an example of a syntax configuration. Syntax is defined in units of matrixes or in units of blocks.

First, syntax defined in units of matrixes will be described.

last_sig_coeff_prefix represents a prefix of the coordinate position of the leading non-zero coefficient in the scan order. last_sig_coeff_suffix represents a suffix of the coordinate position of the leading non-zero coefficient in the scan order.

For example, the prefix is represented by truncated rice binarization and the suffix is represented by a fixed length. FIG. 5 is a diagram illustrating a prefix code string and a suffix code string in a case where the maximum value is 32.

Secondly, syntax defined in units of blocks will be described.

coded_block_flag is a flag indicating that there is a non-zero coefficient in a block. Only one such flag is defined for each block.

last_sig_coeff_block prefix represents a prefix of the coordinate position of the leading non-zero coefficient in the scan order in a block. last_sig_coeff_block_suffix represents a suffix of the coordinate position of the leading non-zero coefficient in the scan order in a block. sig_coeff_flag is a flag indicating whether the coefficient is a non-zero coefficient.

coeff_abs_level_greater1_flag is a flag indicating whether the absolute value of the coefficient (non-zero coefficient) is 2 or more. The total number of coefficients represented by such a flag may be provided with, for example, an upper limit such as eight.

coeff_abs_level_greater2_flag is a flag indicating whether the absolute value of a coefficient (non-zero coefficient) having an absolute value of 2 or more at the head in the scan order is 3 or more. coeff_sign_flag is a flag indicating a positive or negative sign of a coefficient.

coeff_abs_level_remaining represents a value obtained by subtracting the value represented by the above-described flag from the absolute value of the coefficient. coeff_abs_level_remaining is expressed by, for example, a k-exponent Golomb code. FIG. 6 is a diagram illustrating a prefix code string and a suffix code string according to a k-exponential Golomb code.

FIGS. 7 and 8 are diagrams illustrating specific examples of a syntax configuration. Coefficient level values are decoded from each syntax as illustrated in FIG. 7, and then the decoded coefficient level values are rearranged as illustrated in FIG. 8.

(Arithmetic Decoding Unit 206B)

The arithmetic decoding unit 206B targets binary values. The arithmetic decoding unit 206B defines a number straight line from 0 to 1, and divides and uses the section. The section is divided by a binary occurrence probability (hereinafter, referred to as a context value).

The binary decimal is input to the arithmetic decoding unit 206B, and the arithmetic decoding unit 206B decodes the original value according to which section on the number straight line the binary decimal is included.

Here, the context value may be always fixed or may be changed for each bit of the input signal. In a case where the context value is changed every 1 bit, the arithmetic decoding unit 206B receives the context value from the context selection unit 206E.

(Context Value Update Unit 206C)

The context value update unit 206C updates the context value each time 1 bit is decoded.

Here, the context value update unit 206C sets a symbol having a high occurrence probability among 0 and 1 as a most probable symbol (MPS), and sets a symbol having a low occurrence probability as a least probable symbol (LPS).

The context value update unit 206C may use a probability update table that slightly updates the probability value in a case where the MPS occurs and greatly updates the probability value in the case where the LPS occurs.

(Context Selection Unit 206E)

The following syntax is decoded by the above-described arithmetic decoding unit 206B and selected by the context selection unit 206E. Note that, since a selection method differs depending on each syntax, an example of the selection method will be described below.

last_sig_coeff_prefix: The context selection unit 206E may create a context number table according to the matrix size or the bit position as illustrated in FIG. 9.

last_sig_coeff_block_prefix: The context selection unit 206E may create a context number table according to a block size or a bit position as illustrated in FIG. 9.

coded_block_flag: The context selection unit 206E may set the context number to 0 when coded_block_flag=0 and set the context number to 1 when coded_block_flag=1 in the decoded right adjacent block as illustrated in FIG. 10.

sig_coeff_flag: The context selection unit 206E sets a value obtained by correcting a certain reference value by the position of the coefficient or coded_block_flag of the decoded right adjacent block as the context number. For example, the context selection unit 206E sets the reference value to 0 in the leftmost block and 3 in the other blocks, for example. For correction of the context number, the context selection unit 206E may use a table as illustrated in FIGS. 11-1 and 11-3 in the case of coded_block_flag=0 in the decoded right adjacent block, and may use a table as illustrated in FIG. 11-2 in the case of coded_block_flag=1.

coeff_abs_level_greater1_flag and coeff_abs_level_greater2_flag: The context selection unit 206E may set the context number to 0 in a case where there is a coefficient having an absolute value (level value) of 2 or more in the decoded right adjacent block, and set the context number to 1 if not.

(Operation of Coefficient Level Value Decoding Unit 206F2)

Hereinafter, an example of the operation of the coefficient level value decoding unit 206F2 will be described with reference to FIG. 12.

Figure 12:
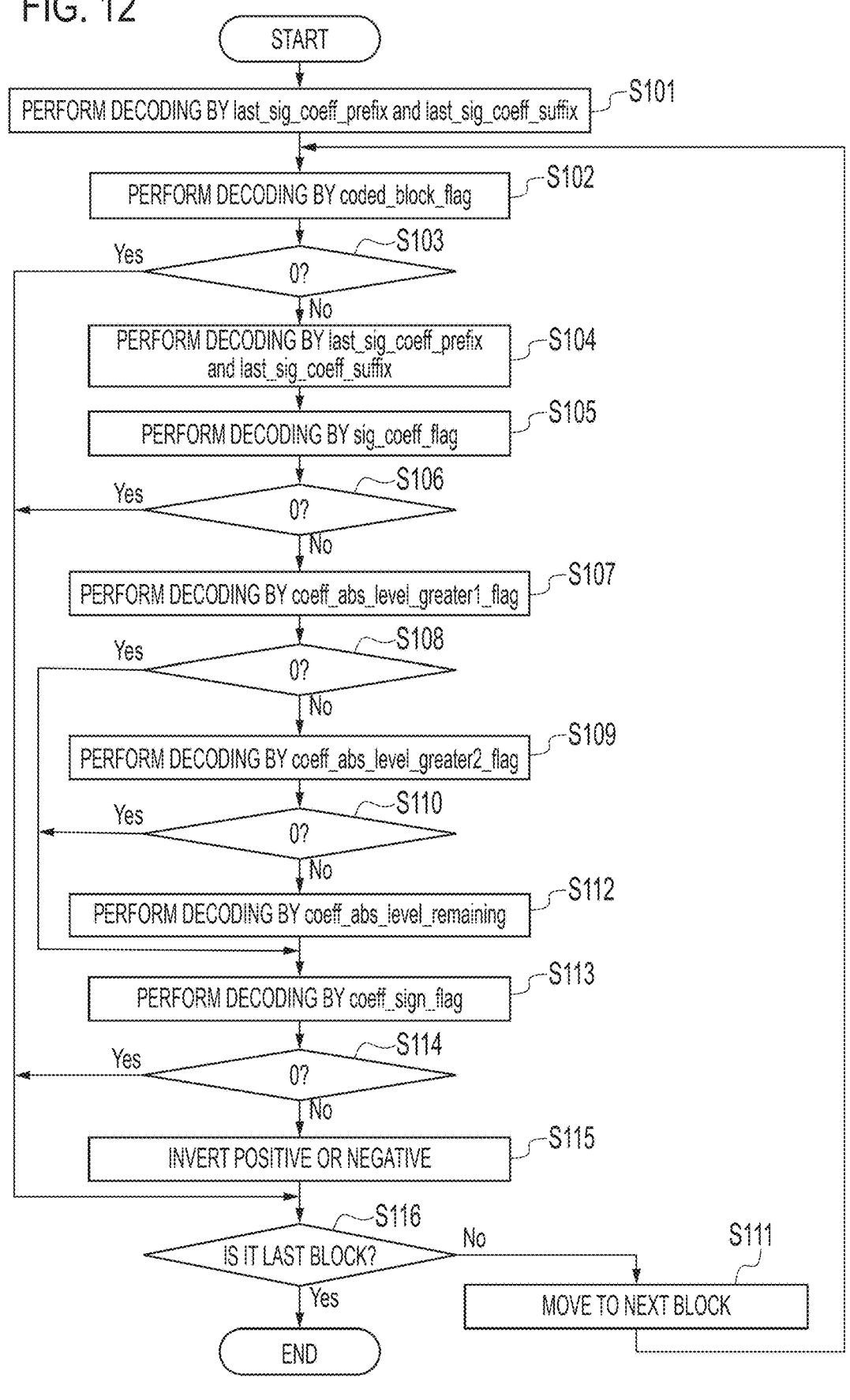
FIG. 12 is a flowchart illustrating an example of an operation of a coefficient level value decoding unit 206F2.

As illustrated in FIG. 12, in step S101, the coefficient level value decoding unit 206F2 decodes all the coefficients after the position indicated by last_sig_coeff_prefix and last_sig_coeff_suffix as 0. The subsequent processing is performed in units of blocks.

In step S102, the coefficient level value decoding unit 206F2 decodes coded_block_flag.

In step S103, the coefficient level value decoding unit 206F2 determines whether coded_block_flag is 0 or 1.

In the case of coded_block_flag=0, the coefficient level value decoding unit 206F2 decodes all the coefficients in the currently processed block as 0, and the present operation proceeds to step S116. In the case of coded_block_flag=1, the present operation proceeds to step S104.

In step S104, the coefficient level value decoding unit 206F2 decodes all the coefficients after the position indicated by last_sig_coeff_block_prefix and last_sig_coeff_block_suffix in the currently processed block as 0.

In step S105, the coefficient level value decoding unit 206F2 decodes sig_coeff_flag.

In step S106, the coefficient level value decoding unit 206F2 determines whether sig_coeff_flag is 0 or 1.

In the case of sig_coeff_flag=0, the present operation proceeds to step S116, and in the case of sig_coeff_flag=1, the present operation proceeds to step S107.

In step S107, the coefficient level value decoding unit 206F2 decodes coeff_abs_level_greater1_flag.

In step S108, the coefficient level value decoding unit 206F2 determines whether coeff_abs_level_greater1_flag is 0 or 1.

In the case of coeff_abs_level_greater1_flag=0, the present operation proceeds to step S113, and in the case of coeff_abs_level_greater1_flag=1, the present operation proceeds to step S109.

In step S109, the coefficient level value decoding unit 206F2 decodes coeff_abs_level_greater2_flag.

In step S110, the coefficient level value decoding unit 206F2 determines whether coeff_abs_level_greater2_flag is 0 or 1.

In the case of coeff_abs_level_greater2_flag=0, the present operation proceeds to step S113, and in the case of coeff_abs_level_greater1_flag=1, the present operation proceeds to step S112.

In step S112, the coefficient level value decoding unit 206F2 decodes coeff_abs_level_remaining. Here, for the decoding of coeff_abs_level_remaining, the coefficient level value decoding unit 206F2 sets a value obtained by adding 3 after performing the exponential Golomb decoding as the decoded coefficient level value.

In step S113, the coefficient level value decoding unit 206F2 decodes coeff_sign_flag.

In step S114, the coefficient level value decoding unit 206F2 determines whether coeff_sign_flag is 0 or 1.

In the case of coeff_sign_flag=0, the present operation proceeds to step S116, and in the case of coeff_sign_flag=1, the present operation proceeds to step S115.

In step S115, the coefficient level value decoding unit 206F2 negates the decoded coefficient.

In step S116, the coefficient level value decoding unit 206F2 determines whether the currently processed block is the final block.

In the case of Yes, the present operation ends, and in the case of No, the present operation proceeds to step S111.

In step S111, the coefficient level value decoding unit 206F2 proceeds to the processing for the next block, and the present operation returns to step S102.

Next, an example of the operation of the arithmetic decoding unit 206B, the context selection unit 206E, the context value update unit 206C, and the multi-value conversion unit 206F will be described with reference to FIG. 13.

Figure 13:
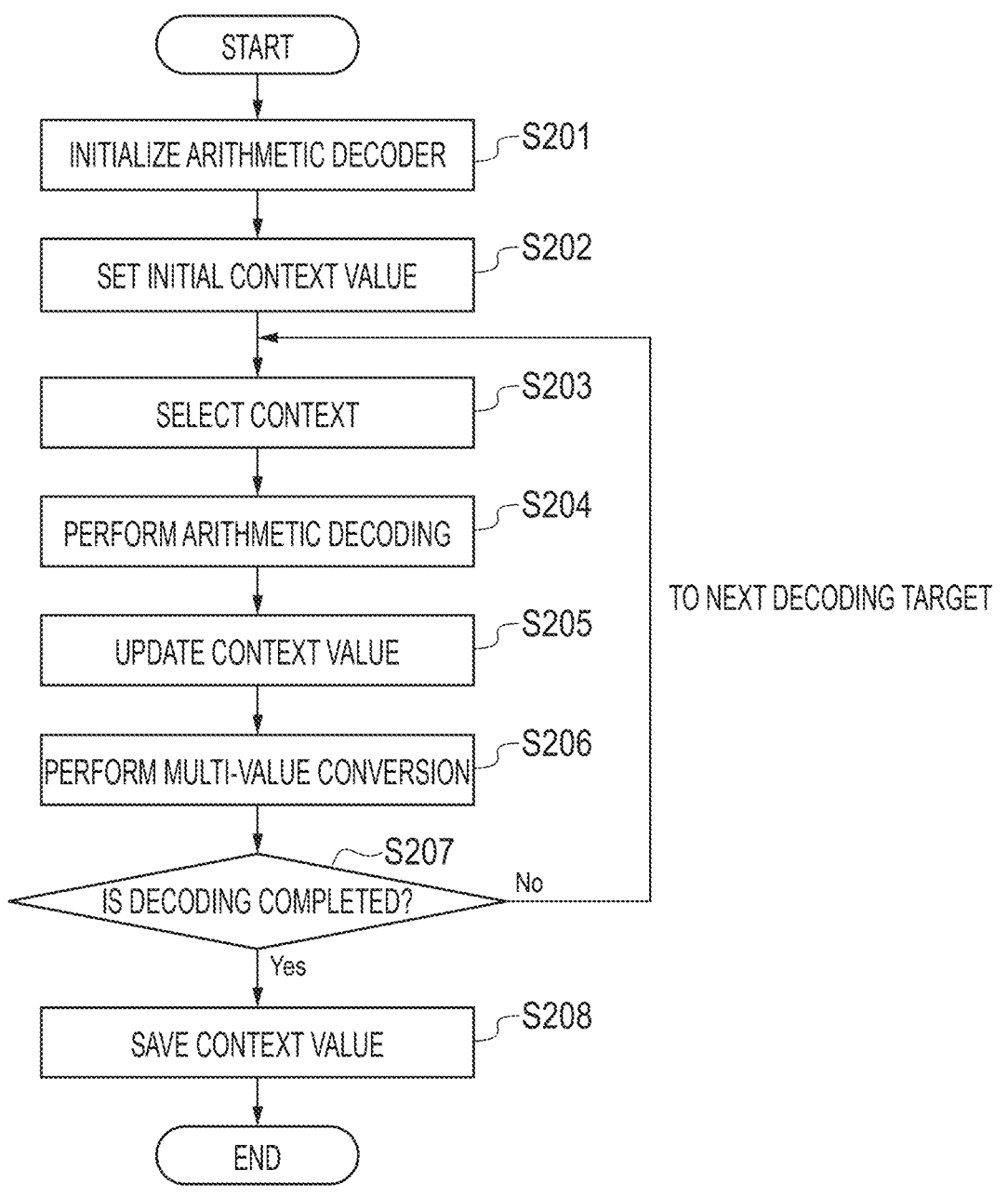
FIG. 13 is a flowchart illustrating an example of an operation of an arithmetic decoding unit 206B, a context selection unit 206E, a context value update unit 206C, and a multi-value conversion unit 206F.

As illustrated in FIG. 13, the arithmetic decoding unit 206B initializes in step S201, and sets an initial context value in step S202.

The arithmetic decoding unit 206B selects a context in step S203, and performs arithmetic decoding in step S204.

In step S205, the context value update unit 2060 and the context selection unit 206E update the context value, and in step S206, the multi-value conversion unit 206F performs multi-value conversion.

In step S207, the multi-value conversion unit 206F determines whether all decoding is completed. In the case of Yes, the present operation proceeds to step S208, and in the case of No, the present operation returns to step S203.

In step S208, the multi-value conversion unit 206F saves the context value.

(Bit Stream Configuration)

Hereinafter, an example of a configuration of a bit stream of the displacement will be described with reference to FIG. 14.

First, the bit stream may include a displacement parameter set (DPS) that is a set of control information related to decoding of the displacement.

Second, the bit stream may include a frame header that is a set of control information corresponding to the frame.

Third, the bit stream may include the encoded displacement that makes up the frame next to the frame header.

As described above, the bit stream has a configuration in which the frame header and the DPS correspond to each encoded displacement one by one.

Note that the configuration illustrated in FIG. 14 is merely an example. If the frame header and the DPS are configured to correspond to each encoded displacement, elements other than the above may be added as constituent elements of the bit stream. For example, as illustrated in FIG. 14, the bit stream may include a sequence parameter set (SPS).

According to the mesh decoding device 200 of the present embodiment, the encoding efficiency can be improved by dividing the coefficient level value string of the displacement in the frequency domain, introducing syntax indicating a coefficient having a small absolute value, and constructing different context models in each frequency domain.

The mesh encoding device 100 and the mesh decoding device 200 described above may be implemented as programs that cause a computer to execute each function (each step).

According to the present embodiment, for example, comprehensive improvement in service quality can be realized in moving image communication, and thus, it is possible to contribute to the goal 9 "Build resilient infrastructure, promote inclusive and sustainable industrialization and foster innovation" of the sustainable development goal (SDGs) established by the United Nations.

The invention claimed is:

1. A mesh decoding device comprising:
a circuit that decodes a displacement bit stream to generate and output a displacement, wherein
the circuit:
  generates a binarization syntax by performing arithmetic decoding on the displacement bit stream;
  updates a context value using the binarization syntax;
  obtains and accumulates the context values, bit positions, and syntax in a context buffer;
  generates a context value for output using the context value, the bit position, and the syntax read from the context buffer;
  generates and outputs the syntax to the context buffer by multi-value conversion of the binarization syntax;
  generates a coefficient level value from the syntax;
  generates transformed coefficients by inversely quantizing the coefficient level values; and
  generates a prediction residual by applying an inverse wavelet transform to the transformed coefficients.

2. The mesh decoding device according to claim 1, wherein the circuit decodes the binarization syntax in units of blocks, generates the syntax in units of blocks, and generates the coefficient level value in units of blocks.

3. The mesh decoding device according to claim 2, wherein the circuit generates the coefficient level value by using a flag indicating that there is a non-zero coefficient in the block, a coordinate position of a leading non-zero coefficient in a scan order in the block, a flag indicating whether a coefficient to be decoded is the non-zero coefficient, a flag indicating whether an absolute value of the non-zero coefficient is 2 or more, a flag indicating whether an absolute value of the non-zero coefficient is 3 or more, a flag indicating a positive or negative sign of the non-zero coefficient, and a value obtained by subtracting 3 from an absolute value of the non-zero coefficient.

4. The mesh decoding device according to claim 3, wherein the circuit:

selects a context number of a decoding target block according to a flag indicating that there is a non-zero coefficient in a decoded right adjacent block;

selects a context number of a flag indicating a positive or negative sign of the non-zero coefficient in the decoding target block according to a flag indicating that there is a non-zero coefficient in the decoded right adjacent block, and in a case where there is a coefficient having an absolute value of 2 or more in the decoded right adjacent block, selects a context number of an absolute value of a non-zero coefficient in the decoding target block.

5. A mesh decoding method comprising:

decoding a displacement bit stream to generate and output a displacement, wherein the decoding includes:

generating a binarization syntax by performing arithmetic decoding on the displacement bit stream;

updating a context value using the binarization syntax;

obtaining and accumulating the context values, bit positions, and syntax in a context buffer;

generating a context value for output using the context value, the bit position, and the syntax read from the context buffer;

generating and outputting the syntax to the context buffer by multi-value conversion of the binarization syntax;

generating a coefficient level value from the syntax;

generating transformed coefficients by inversely quantizing the coefficient level values; and generating a prediction residual by applying an inverse wavelet transform to the transformed coefficients.

6. A non-transitory computer-readable storage medium storing a program for causing a computer to function as a mesh decoding device, wherein the program includes a circuit that decodes a displacement bit stream to generate and output a displacement, and the circuit includes:

generates a binarization syntax by performing arithmetic decoding on the displacement bit stream;

updates a context value using the binarization syntax;

obtains and accumulates the context values, bit positions, and syntax in s context buffer;

generates a context value for output using the context value, the bit position, and the syntax read from the context buffer;

generates and outputs the syntax to the context buffer by multi-value conversion of the binarization syntax;

generates a coefficient level value from the syntax; generates transformed coefficients by inversely quantizing the coefficient level values; and generates a prediction residual by applying an inverse wavelet transform to the transformed coefficients.

* * * * *